US006244166B1

(12) United States Patent
Lebron

(10) Patent No.: US 6,244,166 B1
(45) Date of Patent: Jun. 12, 2001

(54) CHILD PROOF TOASTER WITH TOUCH PAD CONTROLS

(76) Inventor: Rebecca Lebron, 90-19 88th Ave. #F12, Woodhaven, NY (US) 11421

( * ) Notice: Subject to any disclaimer, the term of this patent is extended or adjusted under 35 U.S.C. 154(b) by 0 days.

(21) Appl. No.: 09/557,207

(22) Filed: Apr. 21, 2000

(51) Int. Cl.[7] .............................. A47J 37/00; A47J 37/08
(52) U.S. Cl. ...................... 99/342; 99/329 P; 99/329 RT; 99/385; 99/389; 99/400; 99/446; 219/521; 219/494
(58) Field of Search .............................. 99/325–333, 337, 99/338, 342, 385–391, 400, 401, 444–450, 483; 219/521, 494, 492, 489

(56) References Cited

U.S. PATENT DOCUMENTS

| | | | | |
|---|---|---|---|---|
| 1,697,914 | * | 1/1929 | Hummel et al. ........................ | 99/327 |
| 2,038,028 | * | 4/1936 | De Mattels ............................ | 99/386 |
| 2,182,229 | * | 12/1939 | Hamel ................................... | 99/386 |
| 2,714,348 | * | 8/1955 | Fokakis ................................. | 99/387 |
| 2,928,524 | * | 3/1960 | Jensen ................................ | 99/386 X |
| 2,948,404 | * | 8/1960 | Harrod ............................... | 99/326 X |
| 3,220,336 | * | 11/1965 | Hoover ............................... | 99/443 C |
| 3,277,813 | * | 10/1966 | Luscher ............................... | 99/386 |
| 3,418,920 | * | 12/1968 | Alexander .......................... | 99/443 C |
| 3,659,518 | * | 5/1972 | Porter .................................. | 99/386 |
| 3,869,969 | * | 3/1975 | Sharp .................................. | 99/327 |
| 4,226,176 | * | 10/1980 | Macchi ................................ | 99/335 |
| 4,577,550 | * | 3/1986 | Maroti et al. ..................... | 99/391 X |
| 4,874,929 | | 10/1989 | Houser ............................... | 219/506 |
| 4,986,173 | | 1/1991 | Hahnewald .......................... | 99/338 |
| 5,528,980 | | 6/1996 | McClean ............................. | 99/389 |

* cited by examiner

Primary Examiner—Timothy F. Simone
(74) Attorney, Agent, or Firm—Goldstein & Canino

(57) ABSTRACT

A child proof toaster with touch pad controls including a housing having a generally rectangular configuration. The housing has a top wall, a bottom wall, a front wall, a back wall, opposed side walls and an interior. The top wall has a pair of slots formed therein. The slots are in communication with the interior. The slots receive toastable items therein. The interior has toasting elements disposed therein. The front wall has an opening therein in communication with the interior. A cover member is hingedly coupled with the top wall of the housing. The cover member has an open orientation exposing the pair of slots and a closed orientation covering the pair of slots. A tray portion is removably received within the opening in the front wall of the housing. The tray portion is positionable under the pair of slots in a closed orientation.

7 Claims, 1 Drawing Sheet

CHILD PROOF TOASTER WITH TOUCH PAD CONTROLS

BACKGROUND OF THE INVENTION

The present invention relates to a child proof toaster with touch pad controls and more particularly pertains to preventing unwanted access while allowing for selective operation for particular items to be toasted.

The use of electric toaster devices is known in the prior art. More specifically, electric toaster devices heretofore devised and utilized for the purpose of toasting food items are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,874,929 to Houser discloses a toaster with a visual indicator providing illumination when in use. U.S. Pat. No. 5,528,980 to McClean discloses a toaster with a closure incorporated, constructed of mesh for prevention of fires. U.S. Pat. No. 4,986,173 to Hahnewald discloses a bread toaster which prevents operation when the crumb tray is not inserted.

While these devices fulfill their respective, particular objective and requirements, the aforementioned patents do not describe a child proof toaster with touch pad controls for preventing unwanted access while allowing for selective operation for particular items to be toasted.

In this respect, the child proof toaster with touch pad controls according to the present invention substantially departs from the conventional concepts and designs of the prior art, and in doing so provides an apparatus primarily developed for the purpose of preventing unwanted access while allowing for selective operation for particular items to be toasted.

Therefore, it can be appreciated that there exists a continuing need for a new and improved child proof toaster with touch pad controls which can be used for preventing unwanted access while allowing for selective operation for particular items to be toasted. In this regard, the present invention substantially fulfills this need.

SUMMARY OF THE INVENTION

In the view of the foregoing disadvantages inherent in the known types of electric toaster devices now present in the prior art, the present invention provides an improved child proof toaster with touch pad controls. As such, the general purpose of the present invention, which will be described subsequently in greater detail, is to provide a new and improved child proof toaster with touch pad controls which has all the advantages of the prior art and none of the disadvantages.

To attain this, the present invention essentially comprises a housing having a generally rectangular configuration. The housing has a top wall, a bottom wall, a front wall, a back wall, opposed side walls and an interior. The top wall has a pair of slots formed therein. The slots are in communication with the interior. The slots receive toastable items therein. The interior has toasting elements disposed therein. The front wall has an opening therein in communication with the interior. A cover member is hingedly coupled with the top wall of the housing. The cover member has an open orientation exposing the pair of slots and a closed orientation covering the pair of slots. A tray portion is removably received within the opening in the front wall of the housing. The tray portion includes a non-stick collection area and a grasping handle. The tray portion is positionable under the pair of slots in a closed orientation. A control pad is disposed within the front wall of the housing. The control pad is in communication with the toasting elements of the housing. The control pad is comprised of a plurality of buttons corresponding with predetermined toastable items. An indicating light is disposed within the front wall of the housing. The indicating light is in communication with the toasting elements and the tray portion. The indicating light turns a first color when the toasting elements are activated. The indicating light turns a second color when the tray portion is full.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved child proof toaster with touch pad controls which has all the advantages of the prior art electric toaster devices and none of the disadvantages.

It is another object of the present invention to provide a new and improved child proof toaster with touch pad controls which may be easily and efficiently manufactured and marketed.

It is a further object of the present invention to provide a new and improved child proof toaster with touch pad controls which is of durable and reliable construction.

An even further object of the present invention is to provide a new and improved child proof toaster with touch pad controls which is susceptible of a low cost of manufacture with regard to both materials and labor, and which accordingly is then susceptible of low prices of sale to the consuming public, thereby making such a child proof toaster with touch pad controls economically available to the buying public.

Even still another object of the present invention is to provide a new and improved child proof toaster with touch pad controls for preventing unwanted access while allowing for selective operation for particular items to be toasted.

Lastly, it is an object of the present invention to provide a new and improved child proof toaster with touch pad controls including a housing having a generally rectangular configuration. The housing has a top wall, a bottom wall, a front wall, a back wall, opposed side walls and an interior.

The top wall has a pair of slots formed therein. The slots are in communication with the interior. The slots receive toastable items therein. The interior has toasting elements disposed therein. The front wall has an opening therein in communication with the interior. A cover member is hingedly coupled with the top wall of the housing. The cover member has an open orientation exposing the pair of slots and a closed orientation covering the pair of slots. A tray portion is removably received within the opening in the front wall of the housing. The tray portion is positionable under the pair of slots in a closed orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawing wherein.

DESCRIPTION OF THE PREFERRED EMBODIMENT

Figure 1:
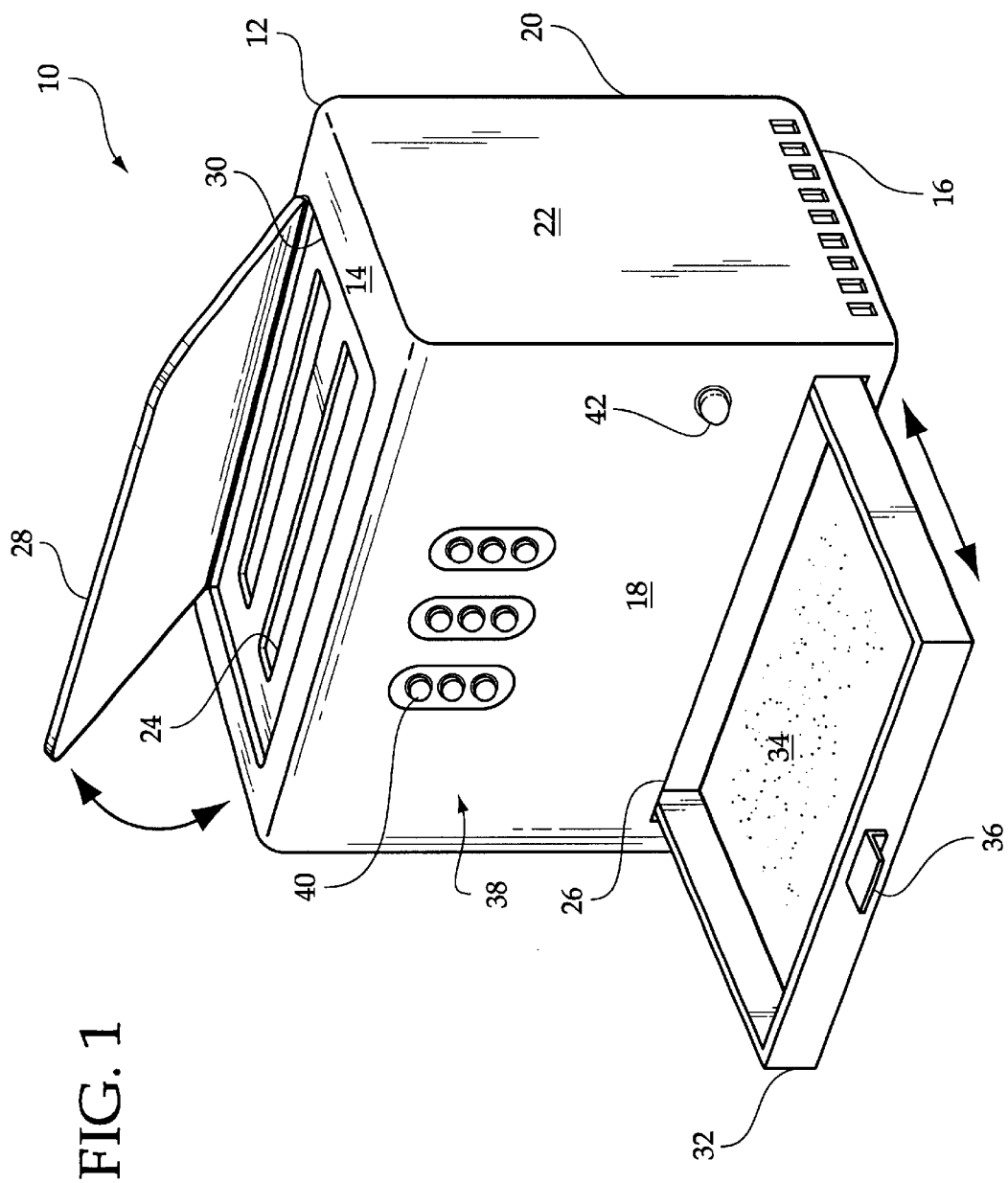
FIG. 1 is a perspective view of the preferred embodiment of the child proof toaster with touch pad controls constructed in accordance with the principles of the present invention.

With reference now to the drawings, and in particular, to FIG. 1 thereof, the preferred embodiment of the new and improved child proof toaster with touch pad controls embodying the principles and concepts of the present invention and generally designated by the reference number 10 will be described.

Specifically, it will be noted in the various Figures that the device relates to a child proof toaster with touch pad controls for preventing unwanted access while allowing for selective operation for particular items to be toasted. In its broadest context, the device consists of a housing, a cover member, a tray portion, a control pad, and an indicating light. Such components are individually configured and correlated with respect to each other so as to attain the desired objective.

The housing 12 has a generally rectangular configuration. The housing 12 has a top wall 14, a bottom wall 16, a front wall 18, a back wall 20, opposed side walls 22 and an interior. The top wall 14 has a pair of slots 24 formed therein. The number of slots 24 used can be varied according to the desired use by consumers. The use of a single slot or more than two slots should also be anticipated. The slots 24 are in communication with the interior. The slots 24 receive toastable items therein. The toastable items are those normally associated with toasting in standard toasters, such as bread, bagels, waffles and the like. The interior has toasting elements disposed therein for toasting the selected items. The front wall 18 has an opening 26 therein in communication with the interior.

The cover member 28 is hingedly coupled with the top wall 14 of the housing 12. The cover member 28 has an open orientation exposing the pair of slots 24 and a closed orientation covering the pair of slots 24. When in the closed orientation, the cover member 28 will be flush with the top wall 14 of the housing 12 because of a recess 30 within the top wall 14 which is dimensioned to receive the cover member 28.

The tray portion 32 is removably received within the opening 26 in the front wall 18 of the housing 12. The tray portion 32 includes a non-stick collection area 34 and a grasping handle 36. The tray portion 32 is positionable under the pair of slots 24 in a closed orientation. The tray portion 32 will collect crumbs and the like from the toastable items that are inserted in the slots 24 for toasting. The tray portion 32 is easily removable to discard the accumulated crumbs.

The control pad 38 is disposed within the front wall 18 of the housing 12. The control pad 38 is in communication with the toasting elements of the housing 12. The control pad 38 is comprised of a plurality of buttons 40 corresponding with predetermined toastable items. The buttons 40 could correspond with light, medium, and dark settings for toasting the toastable items.

The indicating light 42 is disposed within the front wall 18 of the housing 12. The indicating light 42 is in communication with the toasting elements and the tray portion 32. The indicating light 42 turns a first color when the toasting elements are activated. The indicating light 42 turns a second color when the tray portion 32 is full. The indicating light 42 will preferably turn green when the toasting elements are in use. The indicating light 42 will preferably turn red when the tray portion 32 is full of crumbs. A sensor could be positioned at a predetermined height within the tray portion 32 so that the user will be alerted once this level is reached and the tray portion 32 is in need of emptying.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A child proof toaster with touch pad controls for preventing unwanted access while allowing for selective operation for particular items to be toasted comprising, in combination:

a housing having a generally rectangular configuration, the housing having a top wall, a bottom wall, a front wall, a back wall, opposed side walls and an interior, the top wall having a pair of slots formed therein, the slots being in communication with the interior, the slots receiving toastable items therein, the front wall having an opening therein in communication with the interior;

a cover member hingedly coupled with the top wall of the housing, the cover member having an open orientation exposing the pair of slots and a closed orientation covering the pair of slots;

a tray portion removably received within the opening in the front wall of the housing, the tray portion including a nonstick collection area and a grasping handle, the tray portion being positionable under the pair of slots in a closed orientation;

a control pad disposed within the front wall of the housing, the control pad being in communication with the toasting elements of the housing, the control pad being comprised of a plurality of buttons corresponding with predetermined toastable items;

an indicating light disposed within the front wall of the housing, the indicating light being in communication with the toasting elements and the tray portion, the indicating light turning a first color when the toasting elements are activated, the indicating light turning a second color when the tray portion is full.

2. A child proof toaster with touch pad controls for preventing unwanted access while allowing for selective operation for particular items to be toasted comprising, in combination:

a housing having a generally rectangular configuration, the housing having a top wall, a bottom wall, a front wall, a back wall, opposed side walls and an interior, the top wall having a pair of slots formed therein, the slots being in communication with the interior, the slots receiving toastable items therein, the front wall having an opening therein in communication with the interior;

a cover member hingedly coupled with the top wall of the housing, the cover member having an open orientation exposing the pair of slots and a closed orientation covering the pair of slots;

a tray portion removably received within the opening in the front wall of the housing, the tray portion being positionable under the pair of slots in a closed orientation.

3. The child proof toaster with touch pad controls as set forth in claim 2 wherein the tray portion includes a non-stick collection area and a grasping handle.

4. The child proof toaster with touch pad controls as set forth in claim 2 and further including a control pad disposed within the front wall of the housing, the control pad being in communication with the toasting elements of the housing.

5. The child proof toaster with touch pad controls as set forth in claim 4 wherein the control pad is comprised of a plurality of buttons corresponding with predetermined toastable items.

6. The child proof toaster with touch pad controls as set forth in claim 2 and further including an indicating light disposed within the front wall of the housing, the indicating light being in communication with the toasting elements and the tray portion.

7. The child proof toaster with touch pad controls as set forth in claim 6 wherein the indicating light turns a first color when the toasting elements are activated, the indicating light turning a second color when the tray portion is full.

\* \* \* \* \*